(12) United States Patent
Kim

(10) Patent No.: US 9,702,440 B2
(45) Date of Patent: Jul. 11, 2017

(54) POWERTRAIN FOR AUTOMATIC TRANSMISSION

(71) Applicant: Cheol Jin Kim, Gyeonggi-do (KR)

(72) Inventor: Cheol Jin Kim, Gyeonggi-do (KR)

(73) Assignee: Hyundai-Powertech Co., Ltd (KR)

( * ) Notice: Subject to any disclaimer, the term of this patent is extended or adjusted under 35 U.S.C. 154(b) by 0 days.

(21) Appl. No.: 14/773,566

(22) PCT Filed: Mar. 14, 2013

(86) PCT No.: PCT/KR2013/002037
§ 371 (c)(1),
(2) Date: Sep. 8, 2015

(87) PCT Pub. No.: WO2014/142369
PCT Pub. Date: Sep. 18, 2014

(65) Prior Publication Data
US 2016/0025191 A1    Jan. 28, 2016

(30) Foreign Application Priority Data
Mar. 13, 2013 (KR) .................. 10-2013-0026562

(51) Int. Cl.
*F16H 3/66* (2006.01)
*F16H 3/44* (2006.01)

(52) U.S. Cl.
CPC .............. *F16H 3/666* (2013.01); *F16H 3/66* (2013.01); *F16H 2003/442* (2013.01);
(Continued)

(58) Field of Classification Search
None
See application file for complete search history.

(56) References Cited

U.S. PATENT DOCUMENTS

| 4,224,838 A | 9/1980 | Roushdy et al. |
| 6,910,985 B2 * | 6/2005 | Ishimaru .................. F16H 3/66 475/271 |

(Continued)

FOREIGN PATENT DOCUMENTS

| CN | 102207175 A | 10/2011 |
| CN | 102758888 A | 10/2012 |

(Continued)

OTHER PUBLICATIONS

Herbert W. Müller, Die Umlaufgetriebe, Springer-Verlag Berlin Heidelberg 1998.
(Continued)

*Primary Examiner* — Dirk Wright
(74) *Attorney, Agent, or Firm* — Tarolli, Sundheim, Covell & Tummino LLP

(57) ABSTRACT

The present invention relates to a powertrain for an automatic transmission. The powertrain for an automatic transmission consisting of an input shaft, an output shaft and first to third planetary gear sets comprises: first to seventh actuating elements constituting the first to third planetary gear sets; and shifting elements including first to fourth clutches and first and second brakes, wherein at least two of the shifting elements are actuated so that the first to seventh actuating elements are driven or restrained, thereby implementing eight forward speed and two reverse speed ratios.

25 Claims, 16 Drawing Sheets

(52) U.S. Cl.
CPC ............... *F16H 2200/006* (2013.01); *F16H 2200/0086* (2013.01); *F16H 2200/201* (2013.01); *F16H 2200/2046* (2013.01); *F16H 2200/2097* (2013.01)

(56) References Cited

U.S. PATENT DOCUMENTS

| | | | | |
|---|---|---|---|---|
| 6,988,972 B2* | 1/2006 | Usoro | ............... | F16H 3/66 475/275 |
| 7,004,880 B2* | 2/2006 | Bucknor | ............... | F16H 3/66 475/275 |
| 7,033,299 B2* | 4/2006 | Bucknor | ............... | F16H 3/66 475/275 |
| 7,037,232 B2* | 5/2006 | Ishimaru | ............... | F16H 3/663 475/275 |
| 7,056,257 B2* | 6/2006 | Usoro | ............... | F16H 3/66 475/275 |
| 7,059,994 B2* | 6/2006 | Usoro | ............... | F16H 3/66 475/275 |
| 7,086,986 B2* | 8/2006 | Raghavan | ............... | F16H 3/66 475/279 |
| 7,094,173 B2* | 8/2006 | Raghavan | ............... | F16H 3/66 475/276 |
| 7,104,915 B2* | 9/2006 | Tiesler | ............... | F16H 3/66 475/275 |
| 7,118,508 B2* | 10/2006 | Usoro | ............... | F16H 3/66 475/275 |
| 7,118,510 B2* | 10/2006 | Raghavan | ............... | F16H 3/66 475/278 |
| 7,137,923 B2* | 11/2006 | Tiesler | ............... | F16H 3/66 475/275 |
| 7,150,696 B2* | 12/2006 | Bucknor | ............... | F16H 3/66 475/296 |
| 7,201,698 B2* | 4/2007 | Gumpoltsberger | ..... | F16H 3/663 475/276 |
| 7,303,501 B2* | 12/2007 | Raghavan | ............... | F16H 3/66 475/276 |
| 7,462,126 B2* | 12/2008 | Fukuyama | ............... | F16H 3/663 475/275 |
| 7,604,563 B2 | 10/2009 | Phillips | | |
| 7,988,588 B2* | 8/2011 | Phillips | ............... | F16H 3/66 475/284 |
| 8,029,405 B2* | 10/2011 | Kim | ............... | F16H 3/663 475/280 |
| 8,043,191 B2* | 10/2011 | Jang | ............... | F16H 3/66 475/276 |
| 8,303,456 B2* | 11/2012 | Kim | ............... | F16H 3/663 475/284 |
| 8,343,004 B2* | 1/2013 | Jang | ............... | F16H 3/666 475/275 |
| 8,591,377 B1* | 11/2013 | Hoffman | ............... | F16H 3/663 475/285 |
| 9,033,845 B2* | 5/2015 | Oita | ............... | F16H 3/66 475/271 |
| 9,249,865 B2* | 2/2016 | Mellet | ............... | F16H 3/66 |

FOREIGN PATENT DOCUMENTS

| | | |
|---|---|---|
| DE | 29 45 224 A1 | 9/1979 |
| DE | 102 13 820 A1 | 10/2002 |
| DE | 103 15 710 A1 | 10/2004 |
| DE | 103 40 730 A1 | 3/2005 |
| JP | 2009-162339 A | 7/2009 |
| KP | 20090124432 A | 12/2009 |
| KR | 10-0949635 B1 | 3/2010 |
| KR | 10-1072319 B1 | 10/2011 |

OTHER PUBLICATIONS

German Office Action for Application No. 11 2013 006 810.9 dated Feb. 23, 2016.
International Search Report for corresponding PCT/KR2013/002037 dated Jul. 15, 2013.
Chinese Office Action for Application No. 201380076041.2 dated Dec. 28, 2016.

\* cited by examiner

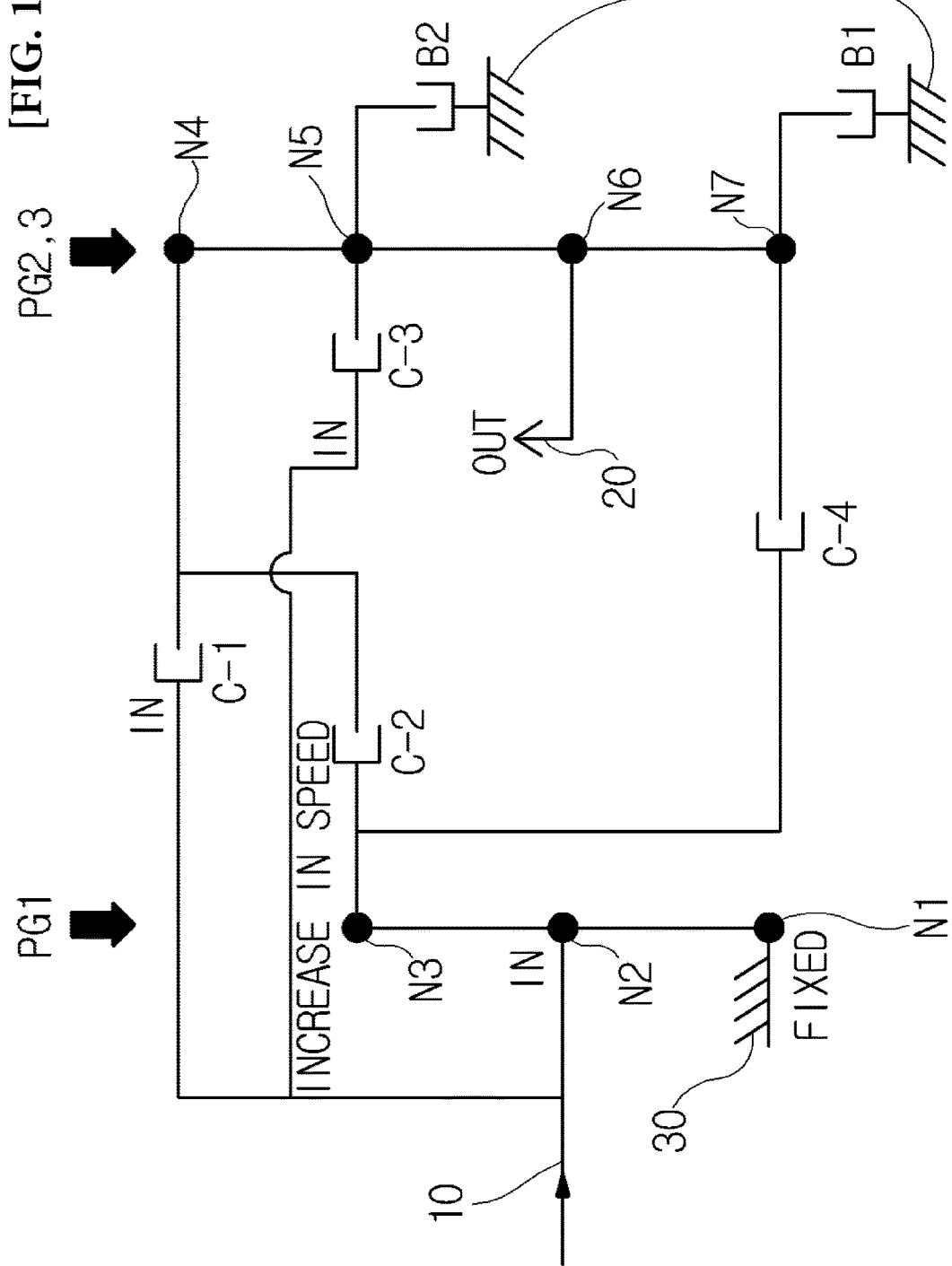

[FIG. 2]

| | | C-1 | C-2 | C-3 | C-4 | B1 | B2 |
|---|---|---|---|---|---|---|---|
| | | CLUTCH | | | | BRAKE | |
| 1 | | O | | | | O | |
| 2 | | | O | | | O | |
| 3 | | | | O | | O | |
| 4 | | O | O | O | | | |
| 5 | | O | | O | | | |
| 6 | | | | O | O | | |
| 7 | | O | | | O | | |
| 8 | | | O | | O | | |
| R1 | | O | | | | | O |
| R2 | | | O | | | | O |

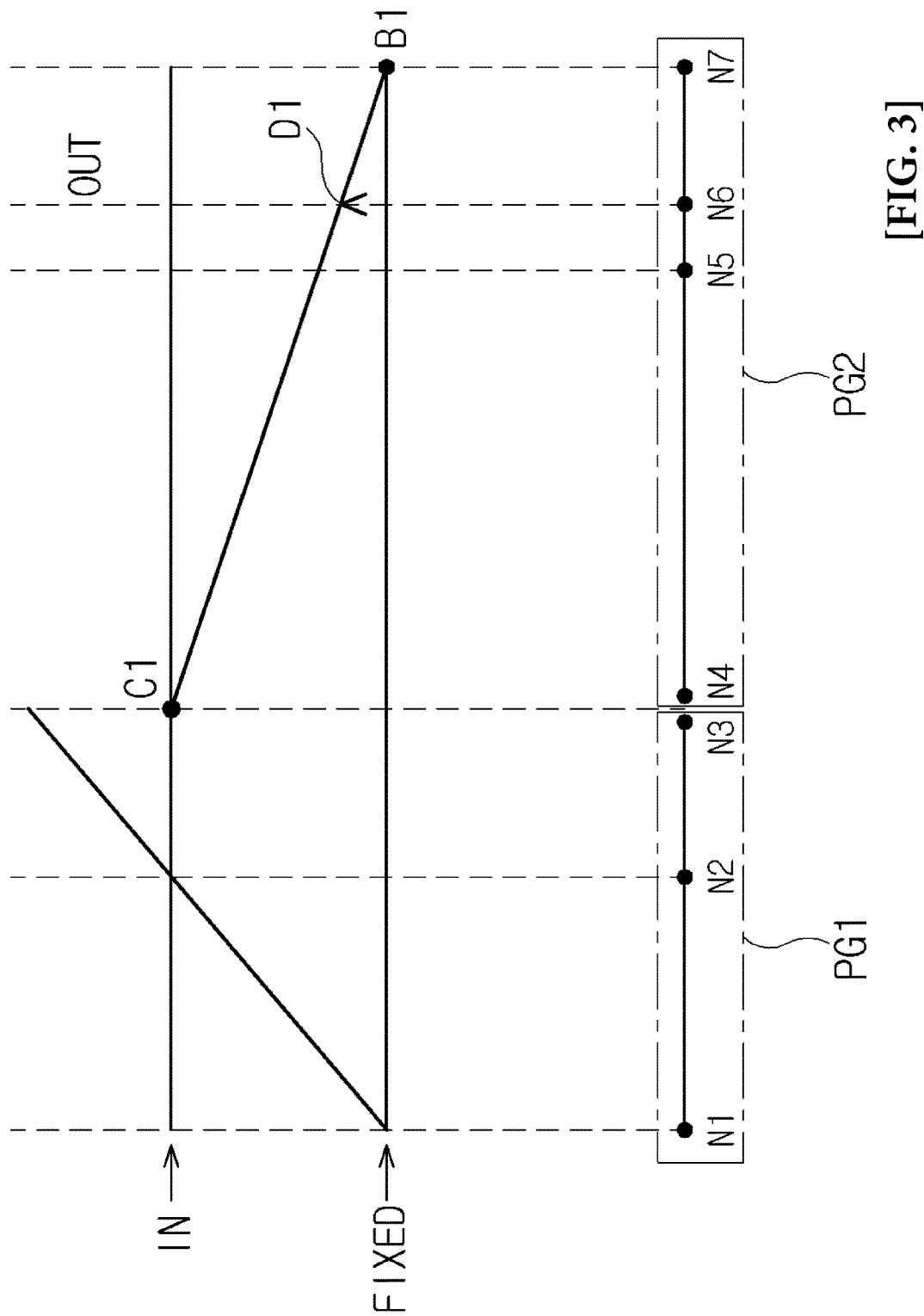

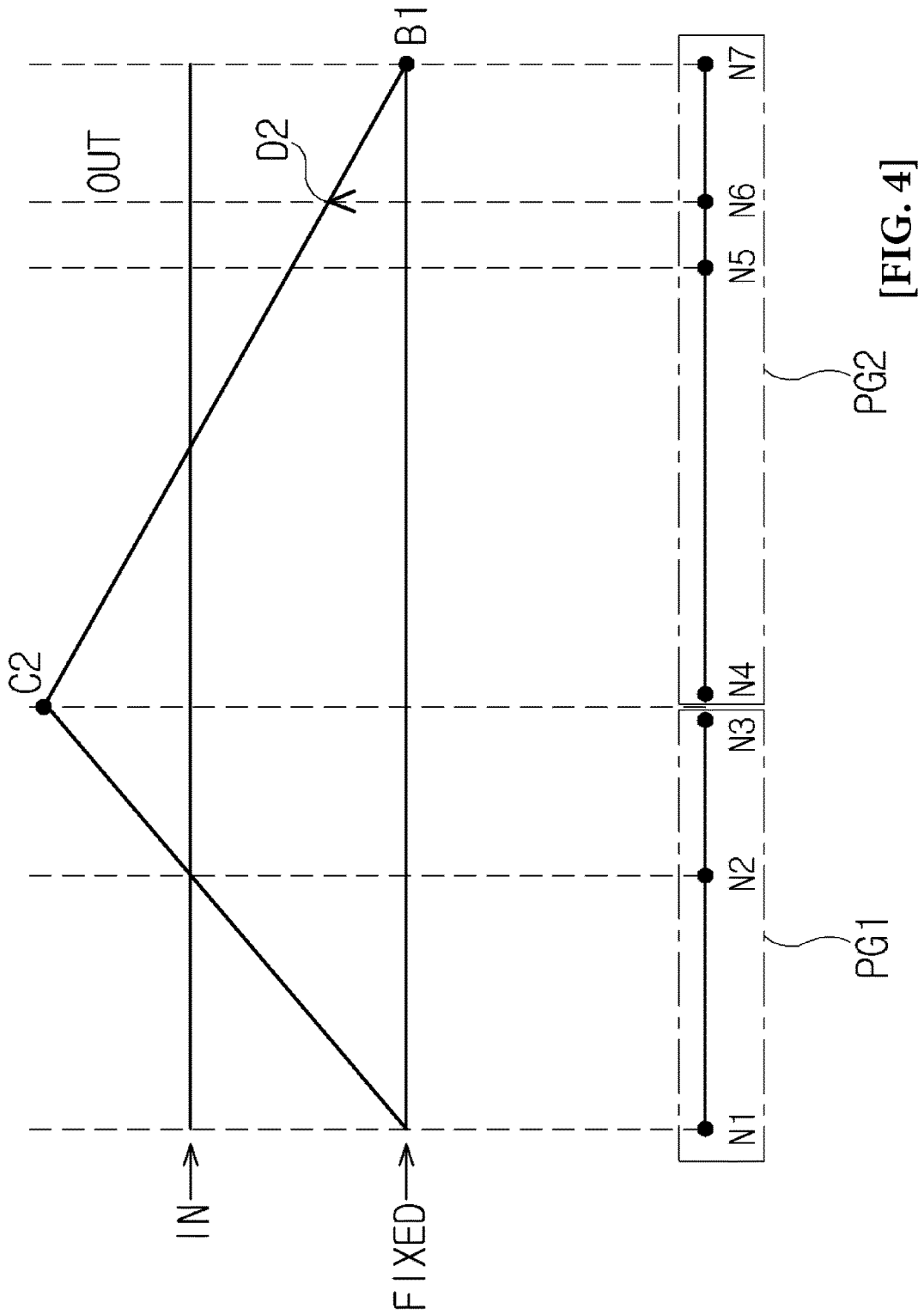
[FIG. 4]

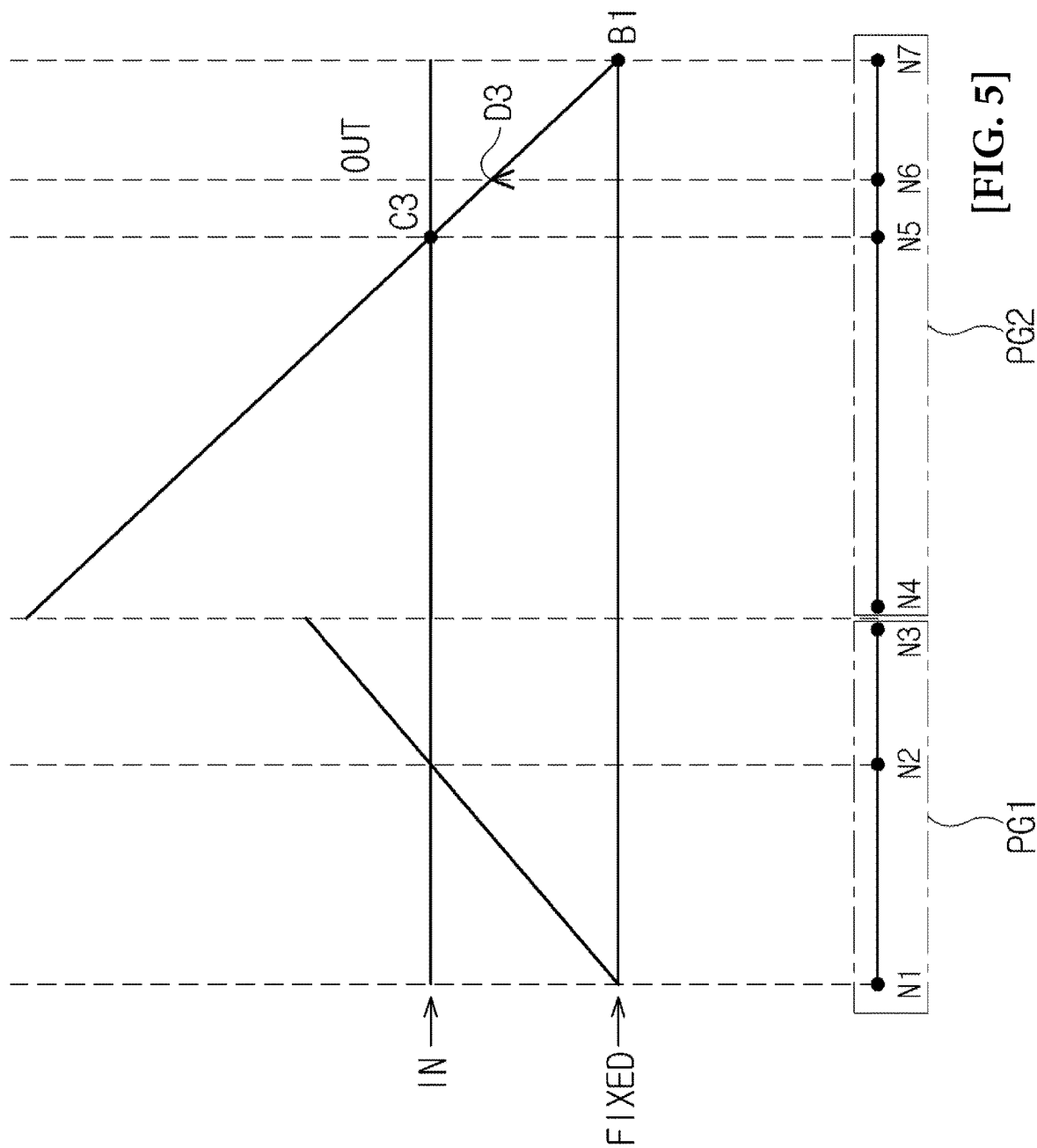
[FIG. 5]

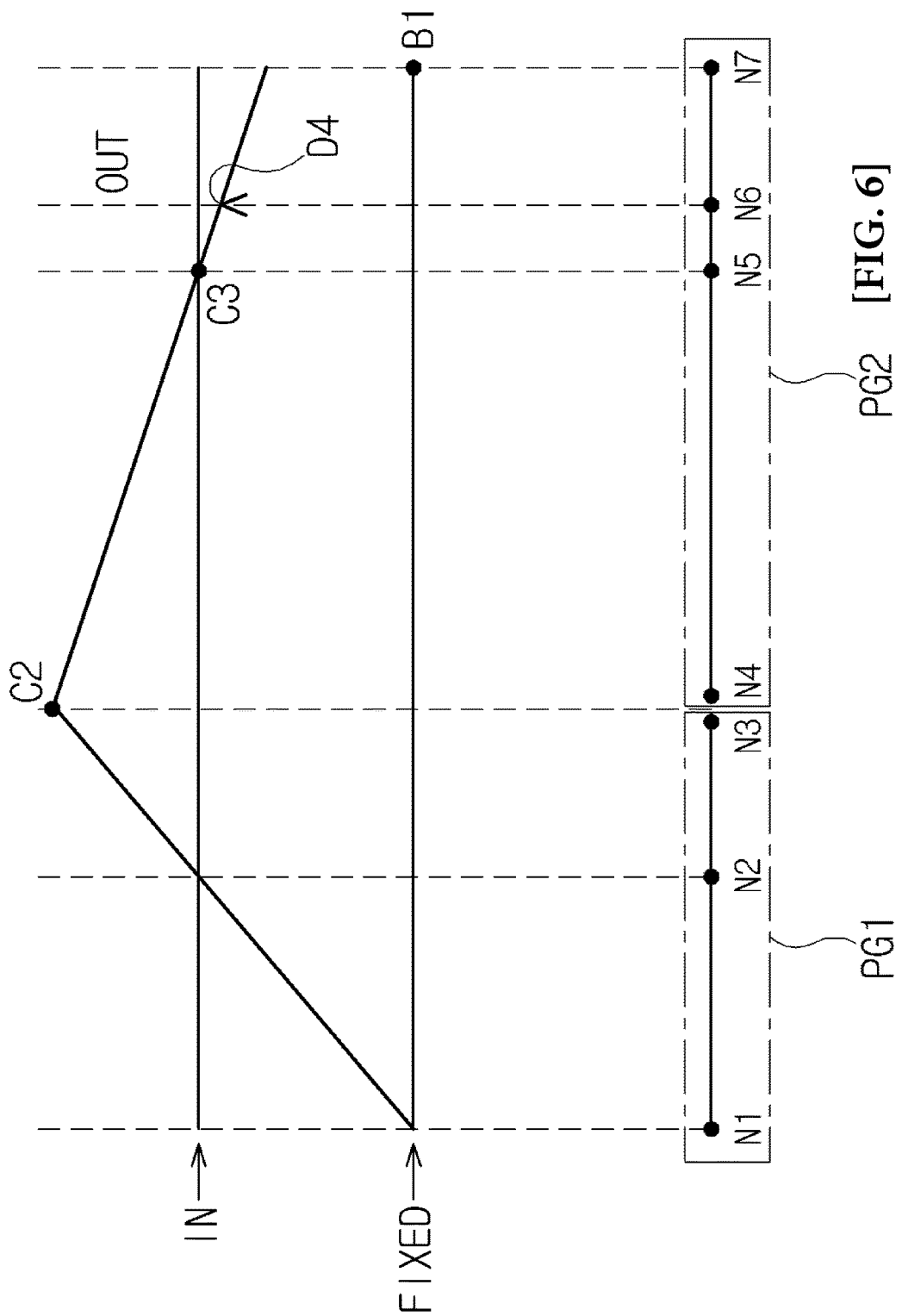

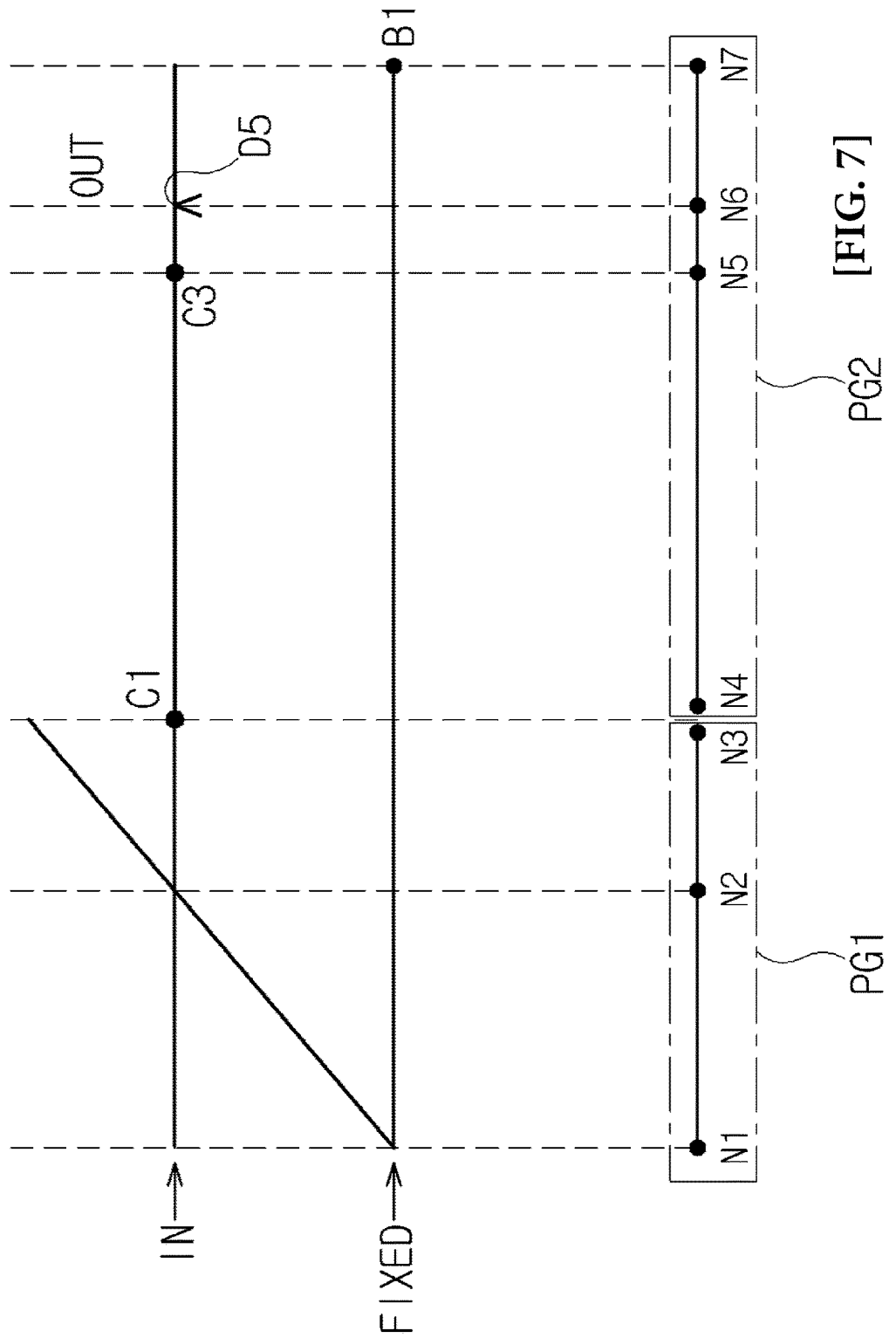

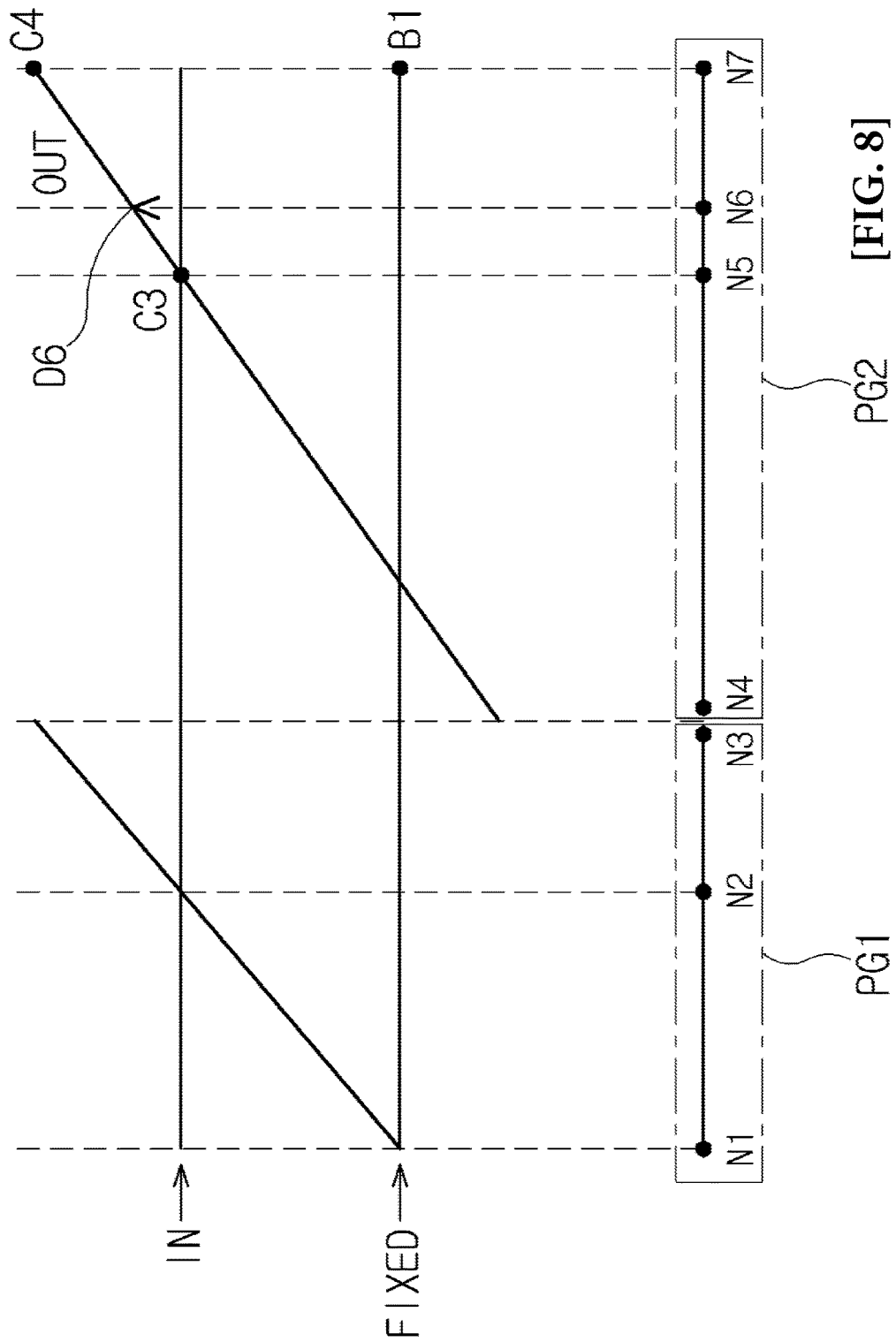

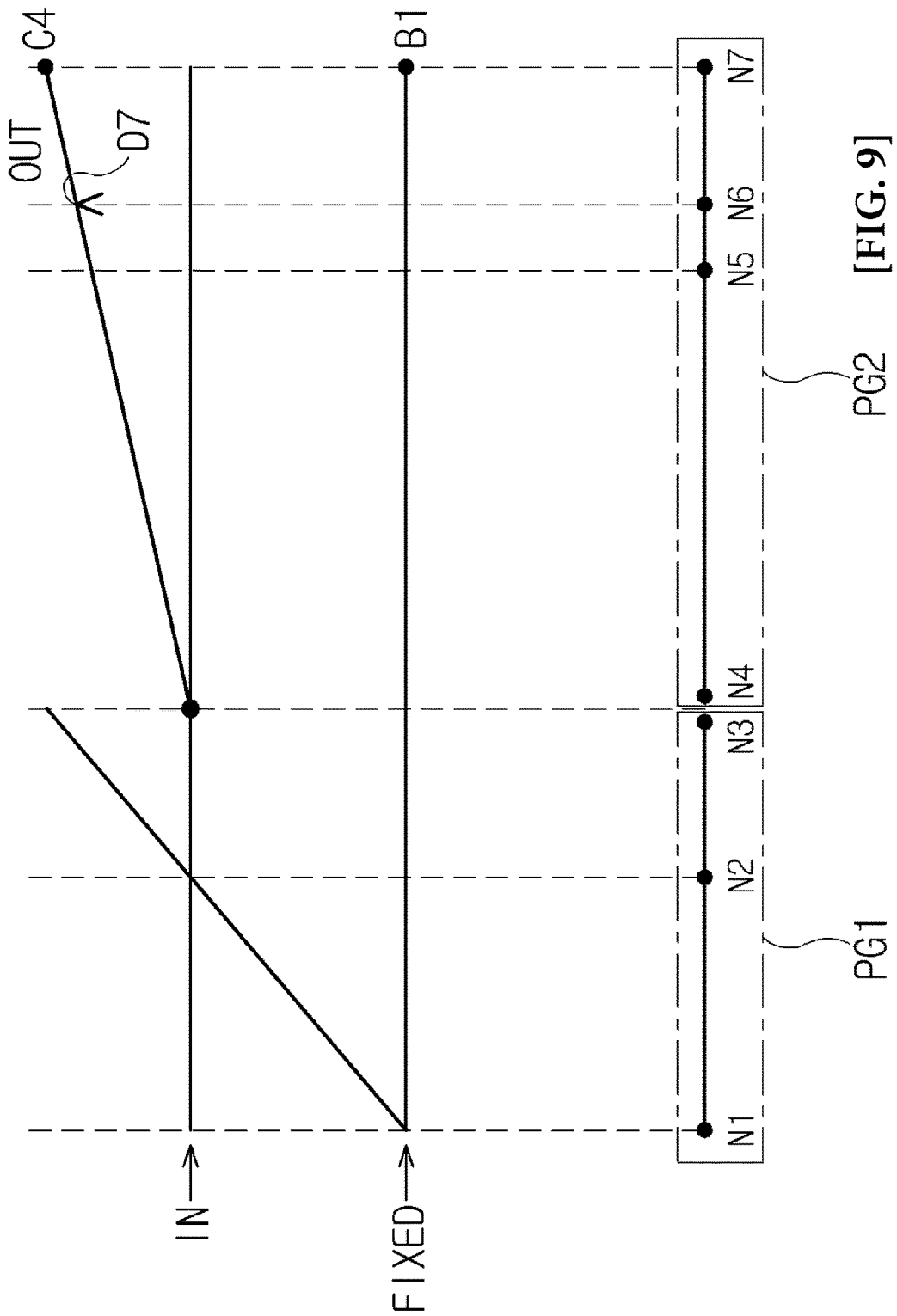
[FIG. 9]

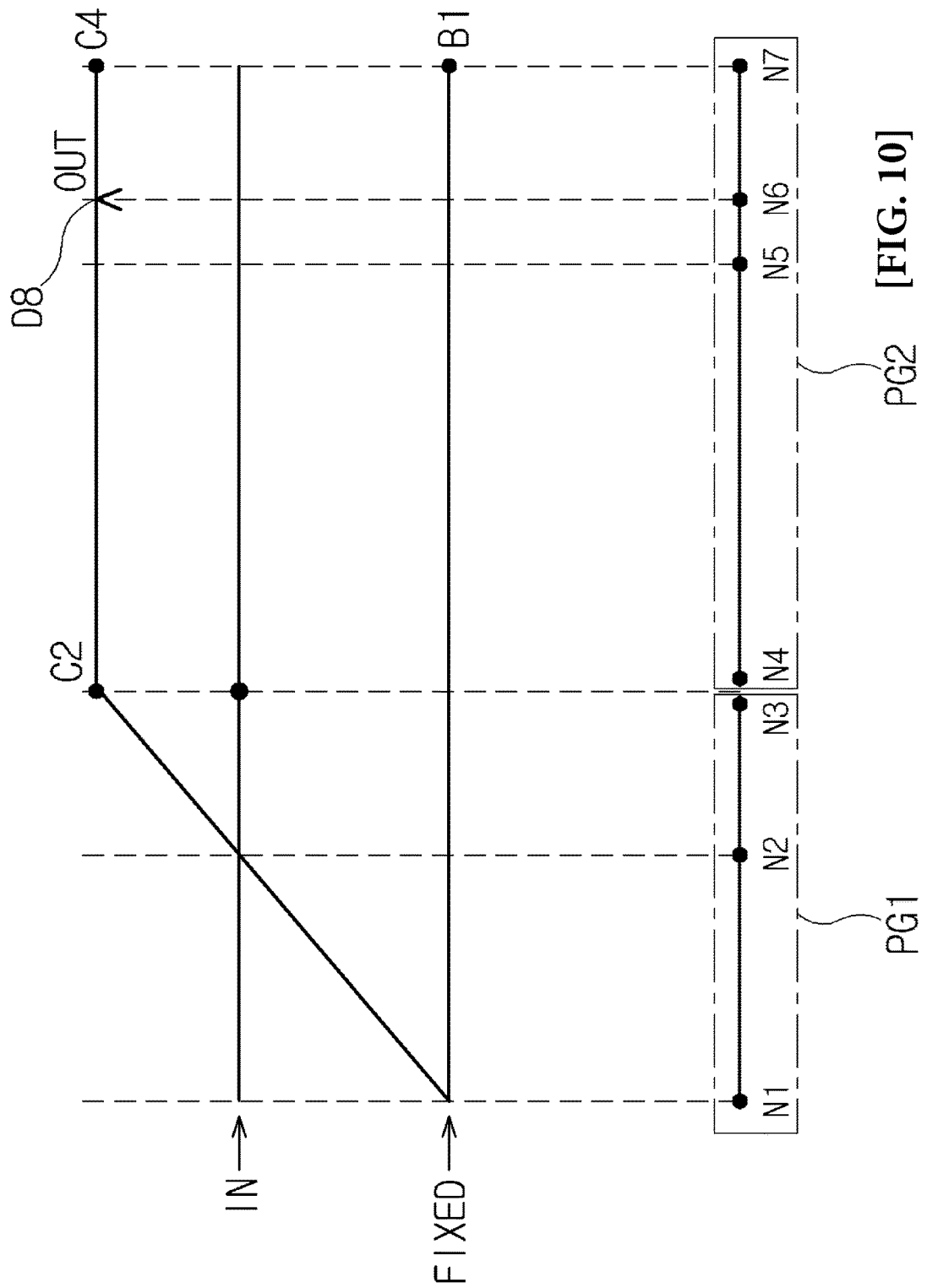
[FIG. 10]

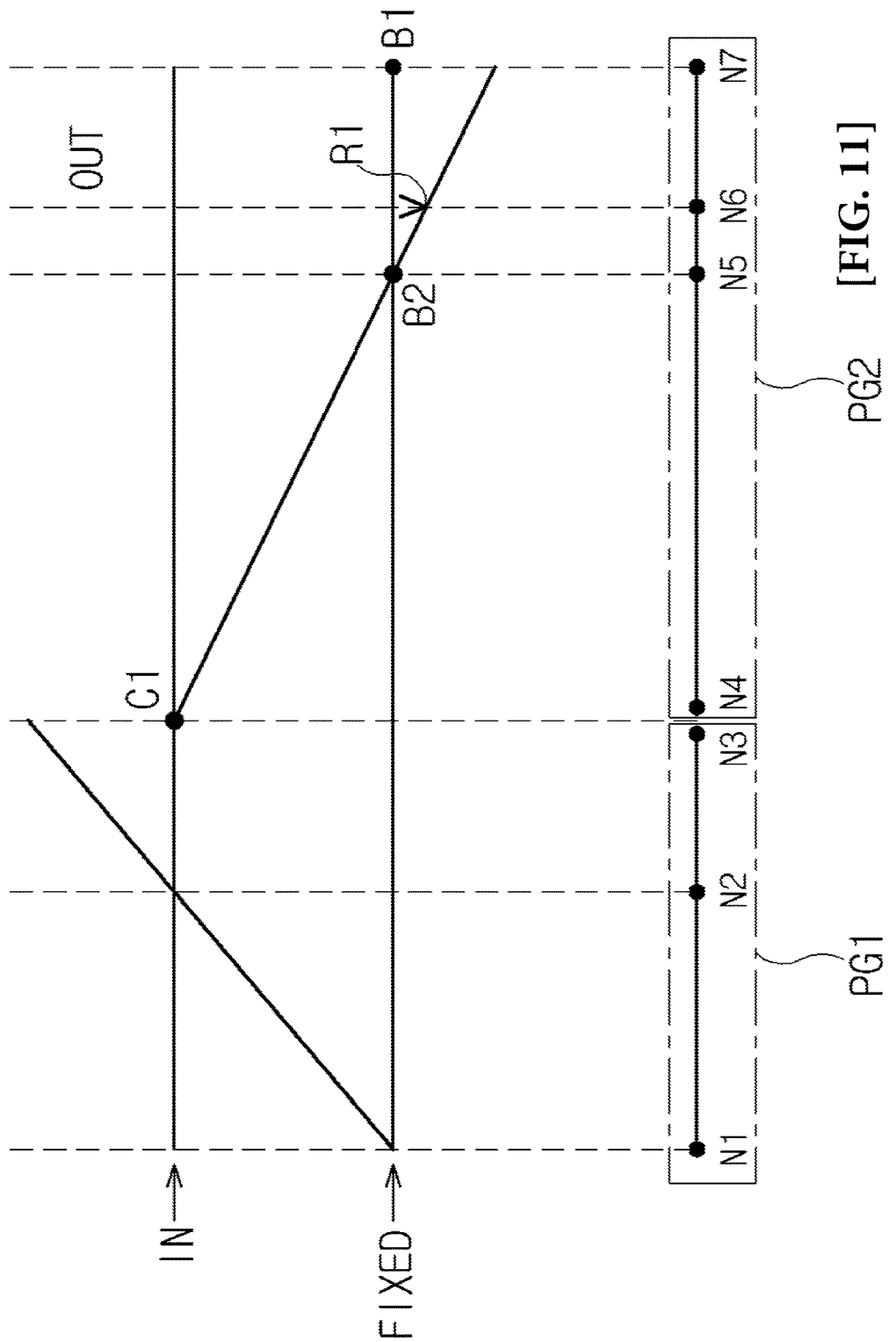

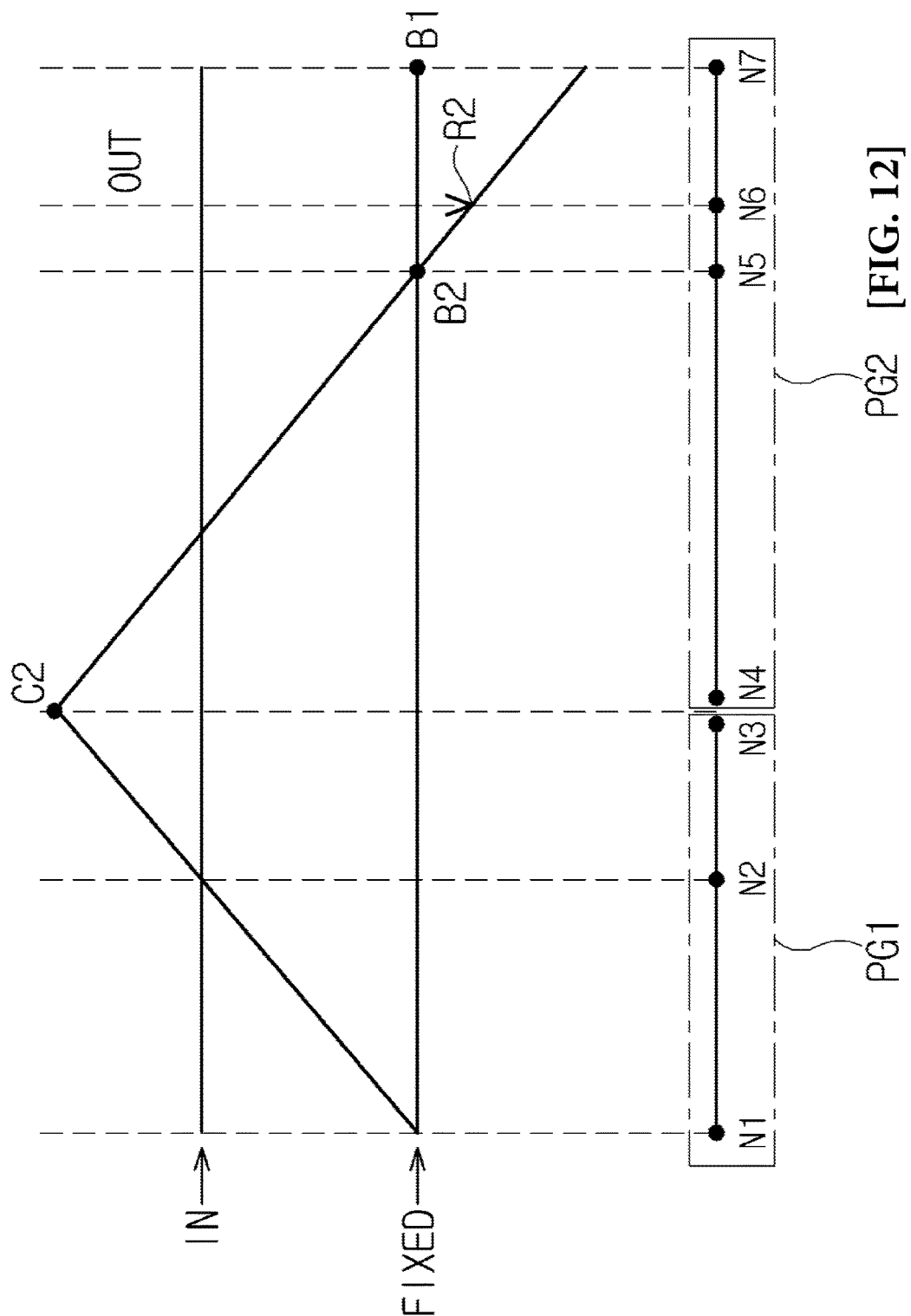
[FIG. 12]

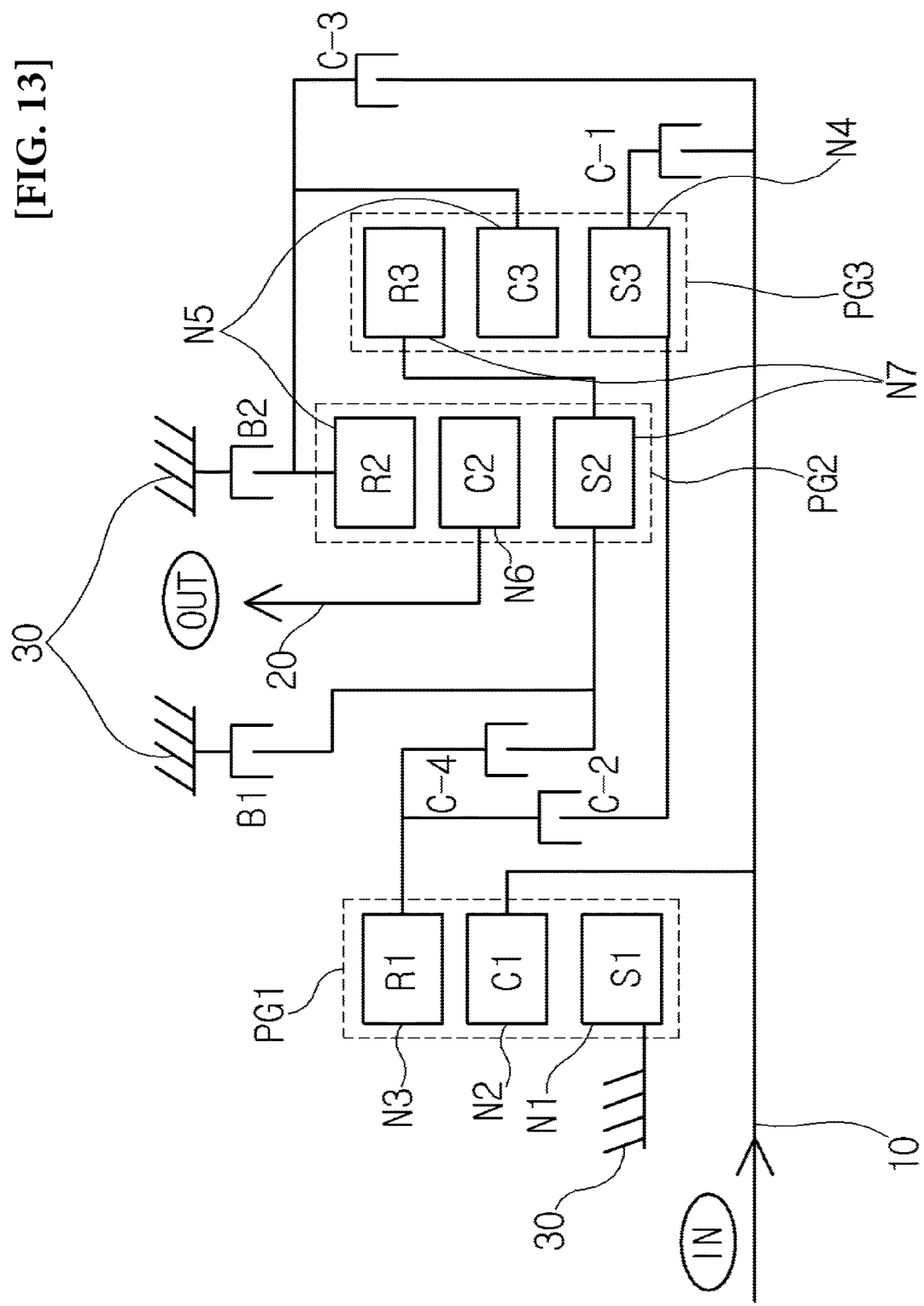
[FIG. 13]

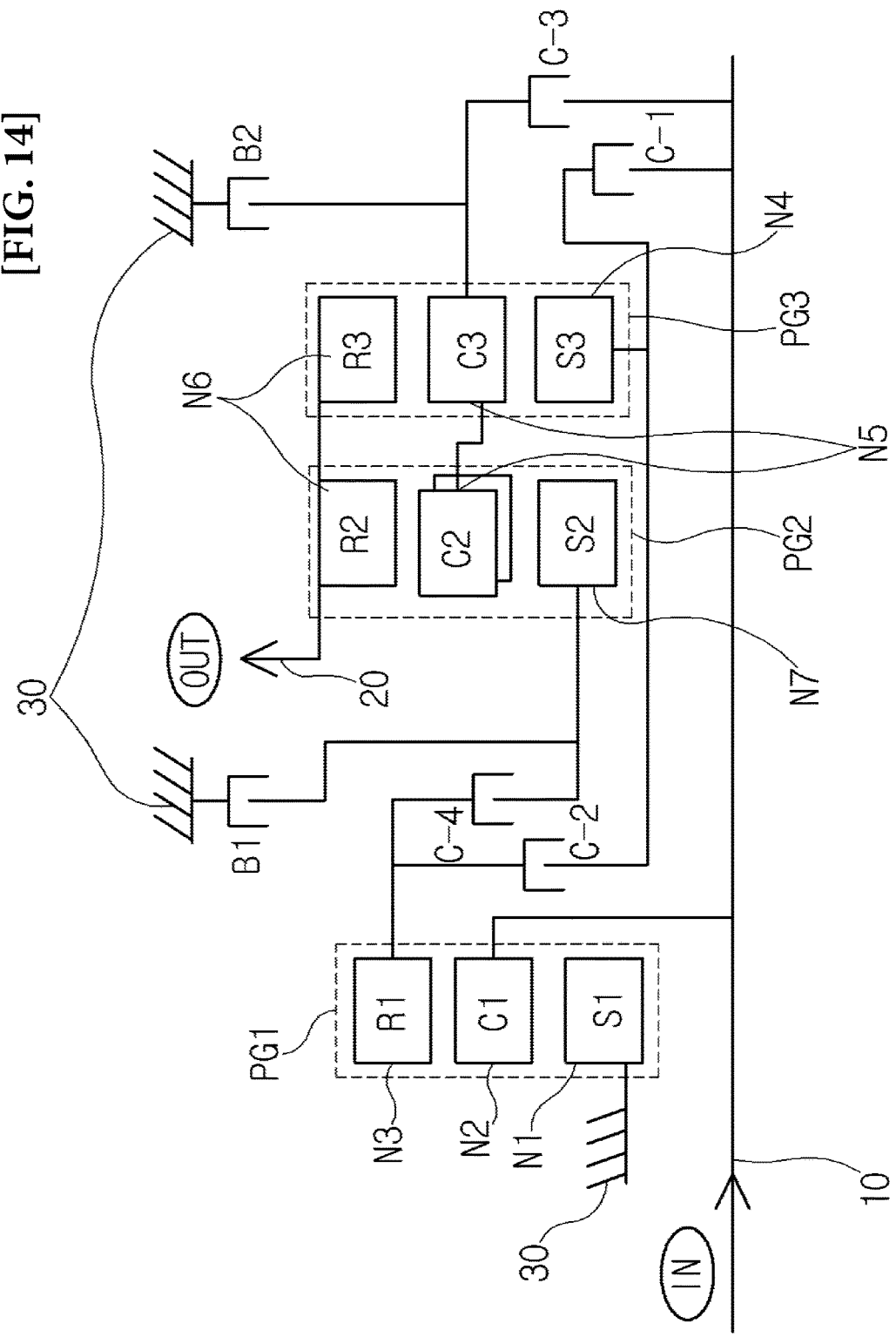
[FIG. 14]

POWERTRAIN FOR AUTOMATIC TRANSMISSION

RELATED APPLICATION

The present invention is a U.S. National Stage under 35 USC 371 patent application, claiming priority to Serial No. PCT/KR2013/002037, filed on 14 Mar. 2013; which claims priority from 10-2013-0026562, filed 13 Mar. 2014, the entirety of both of which are incorporated herein by reference.

TECHNICAL FIELD

The present invention relates to a powertrain for an automatic transmission, and more particularly, to a powertrain for an automatic transmission that realizes eight forward speed and two reverse speed ratios by means of three sets of planetary gears, and a plurality of clutches and brakes.

BACKGROUND ART

Various structures have been attempted in automatic transmissions in order for the power of an engine to be changed to be suitable for a traveling load. However, the automatic transmissions typically have a powertrain structure that includes a gear train having planetary gears, and a hydraulic control unit for operating the gear train.

Such a gear train forms a specific shift stage by combining operations of friction elements, such as clutches or brakes, actuated by the hydraulic control unit. Accordingly, when the hydraulic control unit is actuated according to the traveling of a vehicle and the operation of a driver, a desired gear shift stage is carried out.

The more the automatic transmission has gear shift stages, the better a gear ratio can be properly designed and power output from the engine can be transferred to drive wheels at high efficiency. As a result, it is possible to improve fuel efficiency, acceleration performance, and shift quality.

Thus, it is necessary to develop a powertrain for an automatic transmission having implementable more gear shift stages.

In addition, the durability and power transfer efficiency of the powertrain, the volume and weigh of the transmission, and the like are varied according to the combination of the planetary gear sets and the friction elements, together with the number of gear shift stages which may be implemented in the powertrain of the automatic transmission. Therefore, a research for a compact powertrain having high strength and less power loss is ongoing.

These automatic transmissions are disclosed in Korean Patent Nos. 10-0986542 and 10-0582486.

As a gear train used for a conventional eight-speed automatic transmission adopts at least four sets of planetary gears, the volume, length, and weight of the automatic transmission are increased, thereby causing an increase in weight of a vehicle and poor fuel efficiency.

DISCLOSURE

Technical Problem

Accordingly, the present invention has been made in view of the above-mentioned problem, and an object thereof is to provide a powertrain for an automatic transmission capable of realizing eight forward speed and two reverse speed ratios through a simple structure in which three planetary gear sets, four clutches, and two brakes are combined with one another, so that an automatic transmission can have a reduced volume, overall length, and weight and be manufactured at low cost, and capable of having improved mounting to a vehicle.

Technical Solution

In accordance with an aspect of the present invention, a powertrain for an automatic transmission, which consists of an input shaft (10), an output shaft (20), and first to third planetary gear sets (PG1, PG2 and PG3), includes first to seventh actuating elements (N1, N2, N3, N4, N5, N6, and N7) constituting the first to third planetary gear sets (PG1, PG2, and PG3), and shifting elements including first to fourth clutches (C-1, C-2, C-3, and C-4) and first and second brakes (B1 and B2), wherein at least two of the shifting elements are actuated so that the first to seventh actuating elements (N1, N2, N3, N4, N5, N6, and N7) are driven or restrained, thereby realizing eight forward speed and two reverse speed ratios.

The first planetary gear set (PG1) may include the first actuating element (N1) connected to the transmission case (30) to act as a fixed element in a state in which rotation thereof is restrained, the second actuating element (N2) connected to the input shaft (10) to act as an equivalent input element, and the third actuating element (N3) acting as a transfer output element in a state of outputting an increased gear ratio through fixed action of the first actuating element (N1). The second and third planetary gear sets (PG2 and PG3) may include the fourth actuating element (N4) variably connected to the input shaft (10) through the first clutch (C-1) while being variably connected to the third actuating element (N3) through the second clutch (C-2), the fifth actuating element (N5) variably connected to the input shaft (10) through the third clutch (C-3) while being variably connected to the transmission case (30) through the second brake (B2) so that rotation of the fifth actuating element is restrained, the sixth actuating element (N6) connected to the output shaft (20), and the seventh actuating element (N7) variably connected to the third actuating element (N3) through the fourth clutch (C-4) while being variably connected to the transmission case (30) through the first brake (B1) so that rotation of the seventh actuating element is restrained.

The first actuating element (N1) may include a first sun gear (S1), the second actuating element (N2) may include a first carrier (C1), and the third actuating element (N3) may include a first ring gear (R1). The first carrier (C1) may be configured as a single pinion gear.

The second planetary gear set (PG2) may include a second sun gear (S2), a second carrier (C2), and a second ring gear (R2), the third planetary gear set (PG3) may include a third sun gear (S3), a third carrier (C3), and a third ring gear (R3), and each of the second and third carriers (C2 and C3) may be configured as a single pinion gear. The fourth actuating element (N4) may include the third sun gear (S3). The fifth actuating element (N5) may include the second ring gear (R2) and the third carrier (C3). The sixth actuating element (N6) may include the second carrier (C2) connected to the output shaft (20). The seventh actuating element (N7) may include the second sun gear (S2) and the third ring gear (R3) which are always connected to each other.

The second planetary gear set (PG2) may include a second sun gear (S2), a second carrier (C2), and a second ring gear (R2), the third planetary gear set (PG3) may include a third sun gear (S3), a third carrier (C3), and a third ring gear (R3), the second carrier (C2) may be configured as a double pinion gear, and the third carrier (C3) may be configured as a single pinion gear. The fourth actuating element (N4) may include the third sun gear (S3). The fifth actuating element (N5) may include the second and third carriers (C2 and C3) which are always connected to each other. The sixth actuating element (N6) may include the second and third ring gears (R2 and R3) which are always connected to each other. The seventh actuating element (N7) may include the second sun gear (S2).

The second planetary gear set (PG2) may include a second sun gear (S2), a second carrier (C2), and a second ring gear (R2), the third planetary gear set (PG3) may include a third sun gear (S3), a third carrier (C3), and a third ring gear (R3), the third planetary gear set (PG3) may be disposed inward, and the second planetary gear set (PG2) may be disposed outside the third planetary gear set (PG3). The fourth actuating element (N4) may include the third sun gear (S3). The fifth actuating element (N5) may include the second ring gear (R2) and the third carrier (C3) which are always connected to each other. The sixth actuating element (N6) may include the second carrier (C2). The seventh actuating element (N7) may include the second sun gear (S2) and the third ring gear (R3) which are integrally formed.

The first actuating element (N1) may include a first sun gear (S1), the second actuating element (N2) may include a first ring gear (R1), and the third actuating element (N3) may include a first carrier (C1). The first carrier (C1) may be configured as a double pinion gear.

The second planetary gear set (PG2) may include a second sun gear (S2), a second carrier (C2), and a second ring gear (R2), the third planetary gear set (PG3) may include a third sun gear (S3), a third carrier (C3), and a third ring gear (R3), the third planetary gear set (PG3) may be disposed inward, and the second planetary gear set (PG2) may be disposed outside the third planetary gear set (PG3). The fourth actuating element (N4) may include the third sun gear (S3). The fifth actuating element (N5) may include the second ring gear (R2) and the third carrier (C3) which are always connected to each other. The sixth actuating element (N6) may include the second carrier (C2). The seventh actuating element (N7) may include the second sun gear (S2) and the third ring gear (R3) which are integrally formed.

Advantageous Effects

A powertrain for an automatic transmission according to the present invention can realize eight forward speed and two reverse speed ratios through a simple structure in which three planetary gear sets, four clutches, and two brakes are combined with one another, so that an automatic transmission can have a reduced volume, overall length, and weight and be manufactured at low cost. In addition, the mounting of the automatic transmission to a vehicle can be improved and the automatic transmission can have improved lubrication and cooling performance.

Furthermore, the eight forward speed and two reverse speed ratios are realized by operating six rotating elements of the three planetary gear sets and operating two friction elements of the four clutches and the two brakes. Accordingly, through such a simple structure, gear shift performance can be enhanced.

BRIEF DESCRIPTION OF DRAWINGS

The above and other objects, features and other advantages of the present invention will be more clearly understood from the following detailed description taken in conjunction with the accompanying drawings, in which:

FIG. 1 is a diagram explaining a configuration of a powertrain for an automatic transmission according to an embodiment of the present invention;

FIG. 2 is an operation chart of the powertrain for an automatic transmission of FIG. 1;

FIGS. 3 to 12 are speed diagrams explaining a speed relationship for each gear shift stage in the powertrain for an automatic transmission of FIG. 1; and FIGS. 13 to 16 are diagrams explaining a configuration of a powertrain for an automatic transmission according to various embodiments of the present invention.

BEST MODE FOR INVENTION

Figure 15:
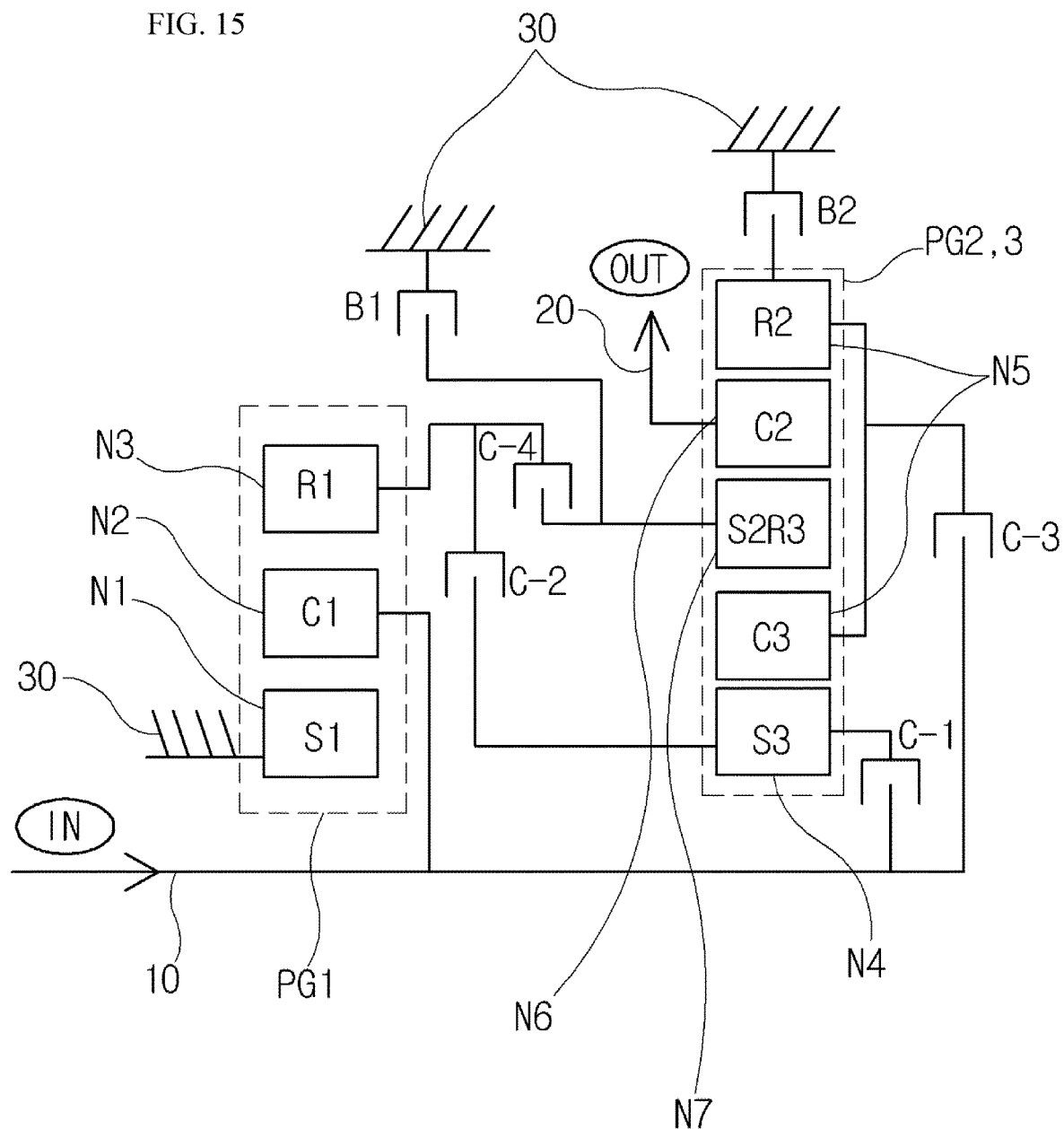

Reference will now be made in detail to embodiments of the present invention, examples of which are illustrated in the accompanying drawings.

Various variations may be performed on the exemplary embodiments according to the concept of the present invention and the embodiments of the present invention can be realized in a wide range of varied forms, and thus specific exemplary embodiments of the present invention will be described herein in detail with reference to the appended drawings of the exemplary embodiments of the present invention. However, the present invention will not be limited only to the specific exemplary embodiments of the present invention which are disclosed herein. Therefore, it should be understood that the scope and spirit of the present invention can be extended to all variations, equivalents, and replacements in addition to the appended drawings of the present invention.

The terms including expressions, such as first and/or second, used in the specification of the present invention may be used to describe various elements of the present invention. However, the elements of the present invention should not be limited by the terms used in the specification of the present invention. In other words, such terms will be used only to differentiate one element from other elements of the present invention. For example, without deviating from the scope and spirit of the present invention, a first element may be referred to as a second element, and, similarly, a second element may also be referred to as a first element.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present.

The terminology used in the specification of the present invention is for the purpose of describing particular embodiments only and is not intended to limit the invention. As used in the specification and the appended claims, the singular forms "a", "an" and "the" are intended to include the plural forms as well, unless context clearly indicates otherwise.

It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

Unless otherwise defined, all terms, including technical and scientific terms, used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In addition, the following embodiments are provided so that this disclosure will be thorough and complete, and will fully convey the concept of the invention to those skilled in the art. The drawings are not necessarily to scale and in some instances, proportions may have been exaggerated in order to clearly illustrate features of the embodiments.

FIG. 1 is a diagram explaining a configuration of a powertrain for an automatic transmission according to an embodiment of the present invention. FIG. 2 is an operation chart of the powertrain for an automatic transmission of FIG. 1.

Referring to FIGS. 1 and 2, the powertrain for an automatic transmission consists of an input shaft 10, an output shaft 20, and first to third planetary gear sets PG1, PG2, and PG3. The first to third planetary gear sets PG1, PG2, and PG3 includes first to seventh actuating elements N1, N2, N3, N4, N5, N6, and N7. In addition, the powertrain for an automatic transmission includes shifting elements which includes first to fourth clutches C-1, C-2, C-3, and C-4, and first and second brakes B1 and B2.

In the powertrain for an automatic transmission, each of the first to third planetary gear sets PG1, PG2, and PG3 is connected to the input shaft 10, the output shaft 20 is connected to the second and third planetary gear sets PG2 and PG3, and a transmission case 30 is connected to each of the first to third planetary gear sets PG1, PG2, and PG3.

The first planetary gear set PG1 includes the first actuating element N1 which is connected to the transmission case 30 to act as a fixed element in the state in which the rotation thereof is restrained, the second actuating element N2 which is connected to the input shaft 10 to act as an equivalent input element, and the third actuating element N3 which acts as a transfer output element in the state of outputting an increased gear ratio through the fixed action of the first actuating element N1.

The second and third planetary gear sets PG2 and PG3 include the fourth actuating element N4 which is variably connected to the input shaft 10 through the first clutch C-1 while being variably connected to the third actuating element N3 through the second clutch C-2, the fifth actuating element N5 which is variably connected to the input shaft 10 through the third clutch C-3 while being variably connected to the transmission case 30 through the second brake B2 so that the rotation of the fifth actuating element is restrained, the sixth actuating element N6 which is connected to the output shaft 20, and the seventh actuating element N7 which is variably connected to the third actuating element N3 through the fourth clutch C-4 while being variably connected to the transmission case 30 through the first brake B1 so that the rotation of the seventh actuating element is restrained.

The second and third planetary gear sets PG2 and PG3 each share two actuating elements with each other, and form four independent actuating elements. The powertrain for an automatic transmission realizes eight forward speed and two reverse speed ratios through the action between the first to seventh actuating elements N1, N2, N3, N4, N5, N6, and N7, the first to fourth clutches C-1, C-2, C-3, and C-4, and the first or second brake B1 or B2. That is, the powertrain for an automatic transmission can realize the eight forward speed and two reverse speed ratios in such a manner that the first to seventh actuating elements N1, N2, N3, N4, N5, N6, and N7 are driven or restrained by the operation of at least two shifting elements.

The process of forming each gear shift stage of the powertrain for an automatic transmission according to the embodiment of the present invention will be described in detail below with reference to the drawings.

FIG. 3 is a speed diagram explaining the relationship to a first forward speed in the powertrain for an automatic transmission of FIG. 1.

Referring to FIG. 3, in a first forward speed D1, the first clutch C-1 and the first brake B1 are actuated. Accordingly, the first and seventh actuating elements N1 and N7 act as fixed elements, and power is input from the input shaft 10 to the fourth actuating element N4 through the first clutch C-1. In this case, the power input to the fourth actuating element N4 is output to the output shaft 20 through the sixth actuating element N6 while being reduced to the speed of the seventh actuating element N7.

FIG. 4 is a speed diagram explaining the relationship to a second forward speed in the powertrain for an automatic transmission of FIG. 1.

Referring to FIG. 4, in a second forward speed D2, the second clutch C-2 and the first brake B1 are actuated. Accordingly, the first and seventh actuating elements N1 and N7 act as fixed elements, and when power is input to the second actuating element N2 through the input shaft 10, the power is increased through the third actuating element N3 to be transferred to the fourth actuating element N4 through the second clutch C-2. In this case, the power transferred to the fourth actuating element N4 is output to the output shaft 20 through the sixth actuating element N6 while being reduced to the speed of the seventh actuating element N7.

FIG. 5 is a speed diagram explaining the relationship to a third forward speed in the powertrain for an automatic transmission of FIG. 1.

Referring to FIG. 5, in a third forward speed D3, the third clutch C-3 and the first brake B1 are actuated. Accordingly, the first and seventh actuating elements N1 and N7 act as fixed elements, and power is input from the input shaft 10 to the fifth actuating element N5 through the third clutch C-3. In this case, the power input to the second actuating element N2 is output to the output shaft 20 through the sixth actuating element N6 while being reduced to the speed of the seventh actuating element N7.

FIG. 6 is a speed diagram explaining the relationship to a fourth forward speed in the powertrain for an automatic transmission of FIG. 1.

Referring to FIG. 6, in a fourth forward speed D4, the second and third clutches C-2 and C-3 are actuated. Accordingly, the first actuating element N1 acts as a fixed element, and power input to the second actuating element N2 through the input shaft 10 is increased through the third actuating element N3 to be transferred to the fourth actuating element N4 through the second clutch C-2. In this case, the power transferred to the fourth actuating element N4 is output to the output shaft 20 through the sixth actuating element N6 while being reduced to the speed of the fifth actuating element N5 which is connected to the input shaft 10 through the third clutch C-3 so as to be rotated.

FIG. 7 is a speed diagram explaining the relationship to a fifth forward speed in the powertrain for an automatic transmission of FIG. 1.

Referring to FIG. 7, in a fifth forward speed D5, the first and third clutches C-1 and C-3 are actuated. Accordingly, the first actuating element N1 acts as a fixed element, power is input from the input shaft 10 to the fourth actuating element N4 through the first clutch C-1, and power is input from the input shaft 10 to the fifth actuating element N5 through the third clutch C-3. In this case, since the fourth and fifth actuating elements N4 and N5 transfer the power input from the input shaft 10 at the same speed, the power is transferred at the same speed to the sixth actuating element N6 to be output to the output shaft 20.

FIG. 8 is a speed diagram explaining the relationship to a sixth forward speed in the powertrain for an automatic transmission of FIG. 1.

Referring to FIG. 8, in a sixth forward speed D6, the third and fourth clutches C-3 and C-4 are actuated. Accordingly, the first actuating element N1 acts as a fixed element, and power is input from the input shaft 10 to the fifth actuating element N5 through the third clutch C-3. When power is input to the second actuating element N2 through the input shaft 10, the power is increased through the third actuating element N3 to be input to the seventh actuating element N7 through the fourth clutch C-4. In this case, the power of the fifth actuating element N5 is output to the output shaft 20 through the sixth actuating element N6 while being increased to the speed of the seventh actuating element N7.

FIG. 9 is a speed diagram explaining the relationship to a seventh forward speed in the powertrain for an automatic transmission of FIG. 1.

Referring to FIG. 9, in a seventh forward speed D7, the first and fourth clutches C-1 and C-4 are actuated. Accordingly, the first actuating element N1 acts as a fixed element, and power is input from the input shaft 10 to the fourth actuating element N4 through the first clutch C-1. When power is input to the second actuating element N2 through the input shaft 10, the power is increased through the third actuating element N3 to be input to the seventh actuating element N7 through the fourth clutch C-4. In this case, the power of the fourth actuating element N4 is output to the output shaft 20 through the sixth actuating element N6 while being increased to the speed of the seventh actuating element N7.

FIG. 10 is a speed diagram explaining the relationship to an eighth forward speed in the powertrain for an automatic transmission of FIG. 1.

Referring to FIG. 10, in an eighth forward speed D8, the second and fourth clutches C-2 and C-4 are actuated. Accordingly, the first actuating element N1 acts as a fixed element. When power is input from the input shaft 10 to the second actuating element N2, the power is increased through the third actuating element N3. The increased power is input to the fourth actuating element N4 through the second clutch C-2, and is input to the seventh actuating element N7 through the fourth clutch C-4. In this case, the fourth and seventh actuating elements N4 and N7 rotate in the state in which the increased power is input thereto, and the increased power is output to the output shaft 20 through the sixth actuating element N6.

FIG. 11 is a speed diagram explaining the relationship to a first reverse speed in the powertrain for an automatic transmission of FIG. 1.

Referring to FIG. 11, in a first reverse speed R1, the first clutch C-1 and the second brake B2 are actuated. Accordingly, the first actuating element N1 acts as a fixed element, power is input from the input shaft 10 to the fourth actuating element N4 through the first clutch C-1, and the rotation of the fifth actuating element N5 is restrained through the second brake B2. In this case, the power of the fourth actuating element N4 is reduced to the speed of the fifth actuating element N5, and reverse force is output to the output shaft 20 through the sixth actuating element N6.

FIG. 12 is a speed diagram explaining the relationship to a second reverse speed in the powertrain for an automatic transmission of FIG. 1.

Referring to FIG. 12, in a second reverse speed R2, the second clutch C-2 and the second brake B2 are actuated. Accordingly, the first actuating element N1 acts as a fixed element. When power is input from the input shaft 10 to the second actuating element N2, the power is increased through the third actuating element N3 so that the increased power is input to the fourth actuating element N4 through the second clutch C-2 and the rotation of the fifth actuating element N5 is restrained through the second brake B2. In this case, the increased power of the fourth actuating element N4 is reduced to the speed of the fifth actuating element N5, and reverse force is output to the output shaft 20 through the sixth actuating element N6.

FIG. 13 is a diagram explaining a configuration of a powertrain for an automatic transmission according to another embodiment of the present invention.

Referring to FIG. 13, the powertrain for an automatic transmission according to another embodiment of the present invention includes first to third planetary gear sets PG1, PG2, and PG3, each of which is connected to an input shaft 10, an output shaft 20 which is connected to the second and third planetary gear sets PG2 and PG3, and a transmission case 30 which is connected to each of the first to third planetary gear sets PG1, PG2, and PG3.

The first planetary gear set PG1 includes a first actuating element N1 having a first sun gear S1 which is connected to the transmission case 30 to act as a fixed element in the state in which the rotation thereof is restrained, a second actuating element N2 having a first carrier C1 which is connected to the input shaft 10 to act as an equivalent input element, and a third actuating element N3 having a first ring gear R1 which acts as a transfer output element in the state of outputting an increased gear ratio through the fixed action of the first actuating element N1.

The first planetary gear set PG1 is connected to the second and third planetary gear sets PG2 and PG3, and the first carrier C1 is configured as a single pinion gear to be connected to the input shaft 10.

The second and third planetary gear sets PG2 and PG3 include a fourth actuating element N4 which is variably connected to the input shaft 10 through a first clutch C-1 while being variably connected to the third actuating element N3 through a second clutch C-2, a fifth actuating element N5 which is variably connected to the input shaft 10 through a third clutch C-3 while being variably connected to the transmission case 30 through a second brake B2 so that the rotation of the fifth actuating element is restrained, a sixth actuating element N6 which is connected to the output shaft 20, and a seventh actuating element N7 which is variably connected to the third actuating element N3 through a fourth clutch C-4 while being variably connected to the transmission case 30 through a first brake B1 so that the rotation of the seventh actuating element is restrained.

The second planetary gear set PG2 includes a second sun gear S2, a second carrier C2, and a second ring gear R2. The third planetary gear set PG3 includes a third sun gear S3, a third carrier C3, and a third ring gear R3. Here, each of the second and third carriers C2 and C3 is configured as a single pinion gear.

The fourth actuating element N4 includes the third sun gear S3. The fifth actuating element N5 includes the second ring gear R2 and the third carrier C3 which are always connected to each other. The sixth actuating element N6 includes the second carrier C2 connected to the output shaft 20. The seventh actuating element N7 includes the second sun gear S2 and the third ring gear R3 which are always connected to each other.

FIG. 14 is a diagram explaining a configuration of a powertrain for an automatic transmission according to still another embodiment of the present invention.

Referring to FIG. 14, the powertrain for an automatic transmission according to still another embodiment of the present invention includes first to third planetary gear sets PG1, PG2, and PG3, each of which is connected to an input shaft 10, an output shaft 20 which is connected to the second and third planetary gear sets PG2 and PG3, and a transmission case 30 which is connected to each of the first to third planetary gear sets PG1, PG2, and PG3.

The first planetary gear set PG1 includes a first actuating element N1 having a first sun gear S1 which is connected to the transmission case 30 to act as a fixed element in the state in which the rotation thereof is restrained, a second actuating element N2 having a first carrier C1 which is connected to the input shaft 10 to act as an equivalent input element, and a third actuating element N3 having a first ring gear R1 which acts as a transfer output element in the state of outputting an increased gear ratio through the fixed action of the first actuating element N1.

The first planetary gear set PG1 is connected to the second and third planetary gear sets PG2 and PG3, and the first carrier C1 is configured as a single pinion gear to be connected to the input shaft 10.

The second and third planetary gear sets PG2 and PG3 include a fourth actuating element N4 which is variably connected to the input shaft 10 through a first clutch C-1 while being variably connected to the third actuating element N3 through a second clutch C-2, a fifth actuating element N5 which is variably connected to the input shaft 10 through a third clutch C-3 while being variably connected to the transmission case 30 through a second brake B2 so that the rotation of the fifth actuating element is restrained, a sixth actuating element N6 which is connected to the output shaft 20, and a seventh actuating element N7 which is variably connected to the third actuating element N3 through a fourth clutch C-4 while being variably connected to the transmission case 30 through a first brake B1 so that the rotation of the seventh actuating element is restrained.

The second planetary gear set PG2 includes a second sun gear S2, a second carrier C2, and a second ring gear R2. The third planetary gear set PG3 includes a third sun gear S3, a third carrier C3, and a third ring gear R3. Here, the second carrier C2 is configured as a double pinion gear, and the third carrier C3 is configured as a single pinion gear.

The fourth actuating element N4 includes the third sun gear S3. The fifth actuating element N5 includes the second and third carriers C2 and C3 which are always connected to each other. The sixth actuating element N6 includes the second and third ring gears R2 and R3 which are always connected to each other. The seventh actuating element N7 includes the second sun gear S2.

FIG. 15 is a diagram explaining a configuration of a powertrain for an automatic transmission according to yet another embodiment of the present invention.

Referring to FIG. 15, the powertrain for an automatic transmission according to yet another embodiment of the present invention includes first to third planetary gear sets PG1, PG2, and PG3, each of which is connected to an input shaft 10, an output shaft 20 which is connected to the second and third planetary gear sets PG2 and PG3, and a transmission case 30 which is connected to each of the first to third planetary gear sets PG1, PG2, and PG3.

The first planetary gear set PG1 includes a first actuating element N1 having a first sun gear S1 which is connected to the transmission case 30 to act as a fixed element in the state in which the rotation thereof is restrained, a second actuating element N2 having a first carrier C1 which is connected to the input shaft 10 to act as an equivalent input element, and a third actuating element N3 having a first ring gear R1 which acts as a transfer output element in the state of outputting an increased gear ratio through the fixed action of the first actuating element N1.

The first planetary gear set PG1 is connected to the second and third planetary gear sets PG2 and PG3, and the first carrier C1 is configured as a single pinion gear to be connected to the input shaft 10.

The second and third planetary gear sets PG2 and PG3 include a fourth actuating element N4 which is variably connected to the input shaft 10 through a first clutch C-1 while being variably connected to the third actuating element N3 through a second clutch C-2, a fifth actuating element N5 which is variably connected to the input shaft 10 through a third clutch C-3 while being variably connected to the transmission case 30 through a second brake B2 so that the rotation of the fifth actuating element is restrained, a sixth actuating element N6 which is connected to the output shaft 20, and a seventh actuating element N7 which is variably connected to the third actuating element N3 through a fourth clutch C-4 while being variably connected to the transmission case 30 through a first brake B1 so that the rotation of the seventh actuating element is restrained.

The second planetary gear set PG2 includes a second sun gear S2, a second carrier C2, and a second ring gear R2. The third planetary gear set PG3 includes a third sun gear S3, a third carrier C3, and a third ring gear R3. Here, each of the second and third carriers C2 and C3 is configured as a single pinion gear. In addition, the second sun gear S2 and the third ring gear R3 are integrally formed, the third planetary gear set PG3 is disposed inside the second sun gear S2 and third ring gear R3, and the second planetary gear set PG2 is disposed outside the third planetary gear set PG3.

The fourth actuating element N4 includes the third sun gear S3. The fifth actuating element N5 includes the second ring gear R2 and the third carrier C3 which are always connected to each other. The sixth actuating element N6 includes the second carrier C2. The seventh actuating element N7 includes the second sun gear S2 and the third ring gear R3 which are integrally formed.

Figure 16:
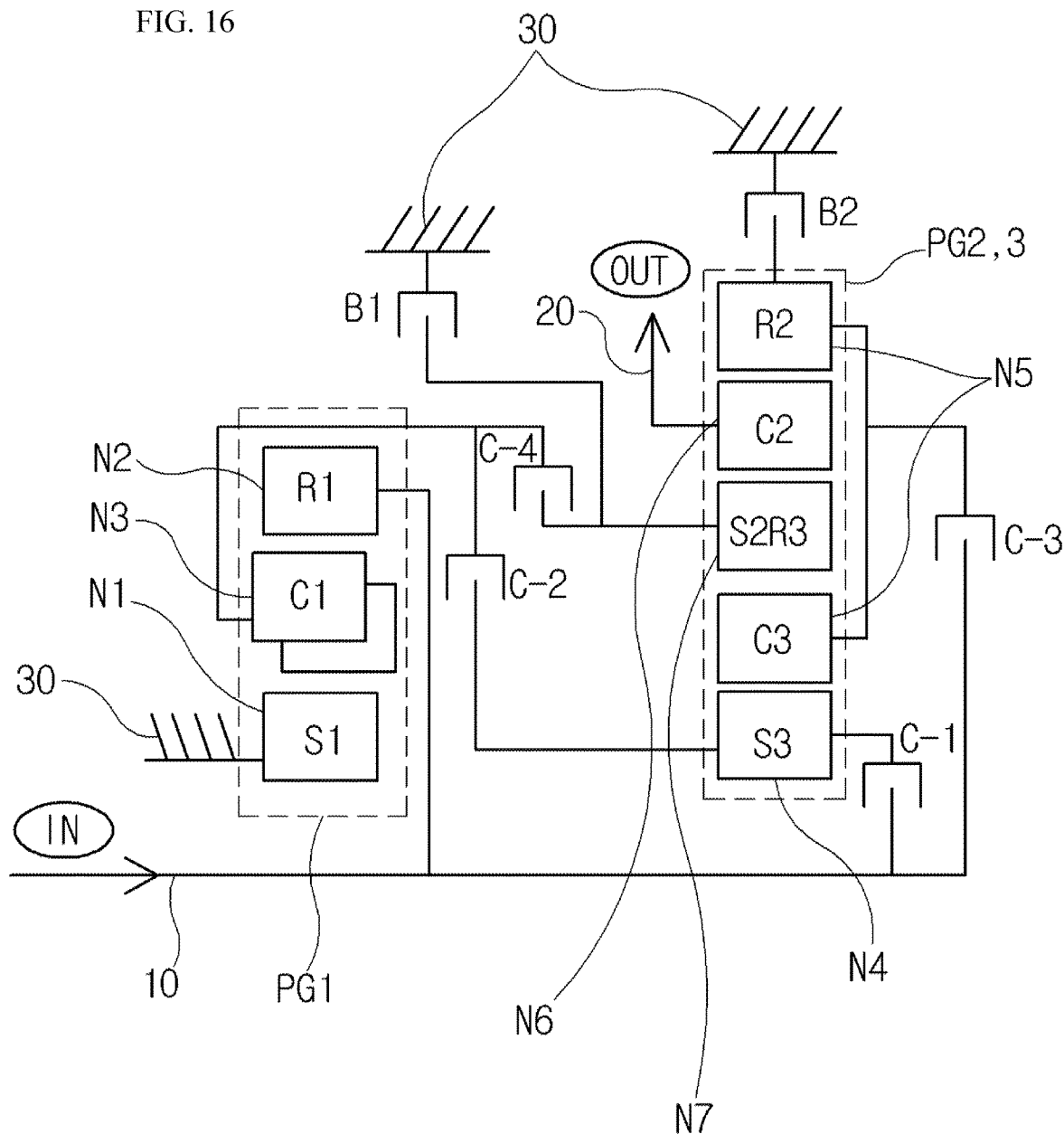

FIG. 16 is a diagram explaining a configuration of a powertrain for an automatic transmission according to a further embodiment of the present invention.

Referring to FIG. 16, the powertrain for an automatic transmission according to the further embodiment of the present invention includes first to third planetary gear sets PG1, PG2, and PG3, each of which is connected to an input shaft 10, an output shaft 20 which is connected to the second and third planetary gear sets PG2 and PG3, and a transmission case 30 which is connected to each of the first to third planetary gear sets PG1, PG2, and PG3.

The first planetary gear set PG1 includes a first actuating element N1 having a first sun gear S1 which is connected to the transmission case 30 to act as a fixed element in the state in which the rotation thereof is restrained, a second actuating element N2 having a first ring gear R1 which is connected to the input shaft 10 to act as an equivalent input element, and a third actuating element N3 having a first carrier C1 which acts as a transfer output element in the state of outputting an increased gear ratio through the fixed action of the first actuating element N1.

The first planetary gear set PG1 is connected to the second and third planetary gear sets PG2 and PG3, and the first carrier C1 is configured as a double pinion gear to be connected to the input shaft 10.

The second and third planetary gear sets PG2 and PG3 include a fourth actuating element N4 which is variably connected to the input shaft 10 through a first clutch C-1 while being variably connected to the third actuating element N3 through a second clutch C-2, a fifth actuating element N5 which is variably connected to the input shaft 10 through a third clutch C-3 while being variably connected to the transmission case 30 through a second brake B2 so that the rotation of the fifth actuating element is restrained, a sixth actuating element N6 which is connected to the output shaft 20, and a seventh actuating element N7 which is variably connected to the third actuating element N3 through a fourth clutch C-4 while being variably connected to the transmission case 30 through a first brake B1 so that the rotation of the seventh actuating element is restrained.

The second planetary gear set PG2 includes a second sun gear S2, a second carrier C2, and a second ring gear R2. The third planetary gear set PG3 includes a third sun gear S3, a third carrier C3, and a third ring gear R3. Here, each of the second and third carriers C2 and C3 is configured as a single pinion gear. In addition, the second sun gear S2 and the third ring gear R3 are integrally formed, the third planetary gear set PG3 is disposed inside the second sun gear S2 and the third ring gear R3, and the second planetary gear set PG2 is disposed outside the third planetary gear set PG3.

The fourth actuating element N4 includes the third sun gear S3. The fifth actuating element N5 includes the second ring gear R2 and the third carrier C3 which are always connected to each other. The sixth actuating element N6 includes the second carrier C2. The seventh actuating element N7 includes the second sun gear S2 and the third ring gear R3 which are integrally formed.

Various embodiments have been described in the best mode for carrying out the invention. It will be understood by those skilled in the art that the above-mentioned technical configurations of the present invention may be realized in any suitable manner without departing from the spirit and scope of the invention as defined by the appended claims.

Although the present invention has been described with respect to the illustrative embodiments, it will be apparent to those skilled in the art that various variations and modifications may be made without departing from the spirit and scope of the invention as defined in the following claims.

The invention claimed is:

1. A powertrain for an automatic transmission consisting of an input shaft, an output shaft, and first to third planetary gear sets, the powertrain comprising:
   first to seventh actuating elements constituting the first to third planetary gear sets; and
   shifting elements comprising first to fourth clutches and first and second brakes,
   wherein at least two of the shifting elements are actuated so that the first to seventh actuating elements are driven or restrained, thereby realizing eight forward speed and two reverse speed ratios,
   wherein:
      the first planetary gear set comprises the first actuating element connected to the transmission case to act as a fixed element in a state in which rotation thereof is restrained, the second actuating element connected to the input shaft to act as an equivalent input element, and the third actuating element acting as a transfer output element in a state of outputting an increased gear ratio through fixed action of the first actuating element; and
      the second and third planetary gear sets comprise the fourth actuating element variably connected to the input shaft through the first clutch while being variably connected to the third actuating element through the second clutch, the fifth actuating element variably connected to the input shaft through the third clutch while being variably connected to the transmission case through the second brake so that rotation of the fifth actuating element is restrained, the sixth actuating element connected to the output shaft, and the seventh actuating element variably connected to the third actuating element through the fourth clutch while being variably connected to the transmission case through the first brake so that rotation of the seventh actuating element is restrained.

2. The powertrain according to claim 1, wherein the first actuating element comprises a first sun gear, the second actuating element comprises a first carrier, and the third actuating element comprises a first ring gear.

3. The powertrain according to claim 2, wherein the first carrier is configured as a single pinion gear.

4. The powertrain according to claim 2, wherein:
   the second planetary gear set comprises a second sun gear, a second carrier, and a second ring gear, and the third planetary gear set comprises a third sun gear, a third carrier, and a third ring gear; and
   each of the second and third carriers is configured as a single pinion gear.

5. The powertrain according to claim 4, wherein the fourth actuating element comprises the third sun gear.

6. The powertrain according to claim 4, wherein the fifth actuating element comprises the second ring gear and the third carrier.

7. The powertrain according to claim 4, wherein the sixth actuating element comprises the second carrier connected to the output shaft.

8. The powertrain according to claim 4, wherein the seventh actuating element comprises the second sun gear and the third ring gear which are always connected to each other.

9. The powertrain according to claim 2, wherein the second planetary gear set comprises a second sun gear, a second carrier, and a second ring gear, and the third planetary gear set comprises a third sun gear, a third carrier, and a third ring gear; and
   the second carrier is configured as a double pinion gear, and the third carrier is configured as a single pinion gear.

10. The powertrain according to claim 9, wherein the fourth actuating element comprises the third sun gear.

11. The powertrain according to claim 9, wherein the fifth actuating element comprises the second and third carriers which are always connected to each other.

12. The powertrain according to claim 9, wherein the sixth actuating element comprises the second and third ring gears which are always connected to each other.

13. The powertrain according to claim 9, wherein the seventh actuating element comprises the second sun gear.

14. The powertrain according to claim 2, wherein:
the second planetary gear set comprises a second sun gear, a second carrier, and a second ring gear, and the third planetary gear set comprises a third sun gear, a third carrier, and a third ring gear; and
the third planetary gear set is disposed inward, and the second planetary gear set is disposed outside the third planetary gear set.

15. The powertrain according to claim 14, wherein the fourth actuating element comprises the third sun gear.

16. The powertrain according to claim 14, wherein the fifth actuating element comprises the second ring gear and the third carrier which are always connected to each other.

17. The powertrain according to claim 14, wherein the sixth actuating element comprises the second carrier.

18. The powertrain according to claim 14, wherein the seventh actuating element comprises the second sun gear and the third ring gear which are integrally formed.

19. The powertrain according to claim 1, wherein the first actuating element comprises a first sun gear, the second actuating element comprises a first ring gear, and the third actuating element comprises a first carrier.

20. The powertrain according to claim 19, wherein the first carrier is configured as a double pinion gear.

21. The powertrain according to claim 19, wherein:
the second planetary gear set comprises a second sun gear, a second carrier, and a second ring gear, and the third planetary gear set comprises a third sun gear, a third carrier, and a third ring gear; and
the third planetary gear set is disposed inward, and the second planetary gear set is disposed outside the third planetary gear set.

22. The powertrain according to claim 19, wherein the fourth actuating element comprises the third sun gear.

23. The powertrain according to claim 19, wherein the fifth actuating element comprises the second ring gear and the third carrier which are always connected to each other.

24. The powertrain according to claim 19, wherein the sixth actuating element comprises the second carrier.

25. The powertrain according to claim 19, wherein the seventh actuating element comprises the second sun gear and the third ring gear which are integrally formed.

* * * * *